United States Patent

[11] 3,600,965

| [72] | Inventor | Walter E. Folkerts<br>Hazel Park, Mich. |
|---|---|---|
| [21] | Appl. No. | 859,382 |
| [22] | Filed | Sept. 19, 1969 |
| [45] | Patented | Aug. 24, 1971 |
| [73] | Assignee | Chrysler Corporation<br>Highland Park, Mich. |

[54] POWER STEERING GEAR
8 Claims, 3 Drawing Figs.

[52] U.S. Cl. .................................................. 74/409,
74/498, 277/170
[51] Int. Cl. ................................................ F16h 55/18,
B62d 1/20, B65d 53/00
[50] Field of Search ............................................. 74/409,
496, 498, 500; 277/168, 169, 170; 280/87

[56] References Cited
UNITED STATES PATENTS
| 1,365,151 | 1/1921 | Burke | 277/168 X |
| 2,740,130 | 4/1956 | Stone | 277/170 X |
| 3,170,338 | 2/1965 | Ivanchich | 74/409 X |
| 3,214,181 | 10/1965 | Rood | 277/170 |
| 3,310,990 | 3/1967 | Zettel | 74/409 |

*Primary Examiner*—Leonard H. Gerin
*Attorney*—Harness, Talburtt and Baldwin

ABSTRACT: An axially adjustable cross shaft for the sector gear of an automobile power steering mechanism is mounted within a housing subject to high pressure fluid. A threaded adjusting bolt secured to the cross shaft to adjust the same screws axially through and is locked in axially adjusted position by a nut tightened against the housing. The threads of the nut and housing are truncated to receive an unthreaded sealing portion of the bolt shank spaced between and having a diameter approximately equal to the pitch diameter of the bolt threads engaging the housing and nut. An O-ring around the unthreaded bolt shank is confined by and forced into sealing engagement with the shank and the housing by cooperating portions of the bolt and nut.

PATENTED AUG 24 1971
3,600,965
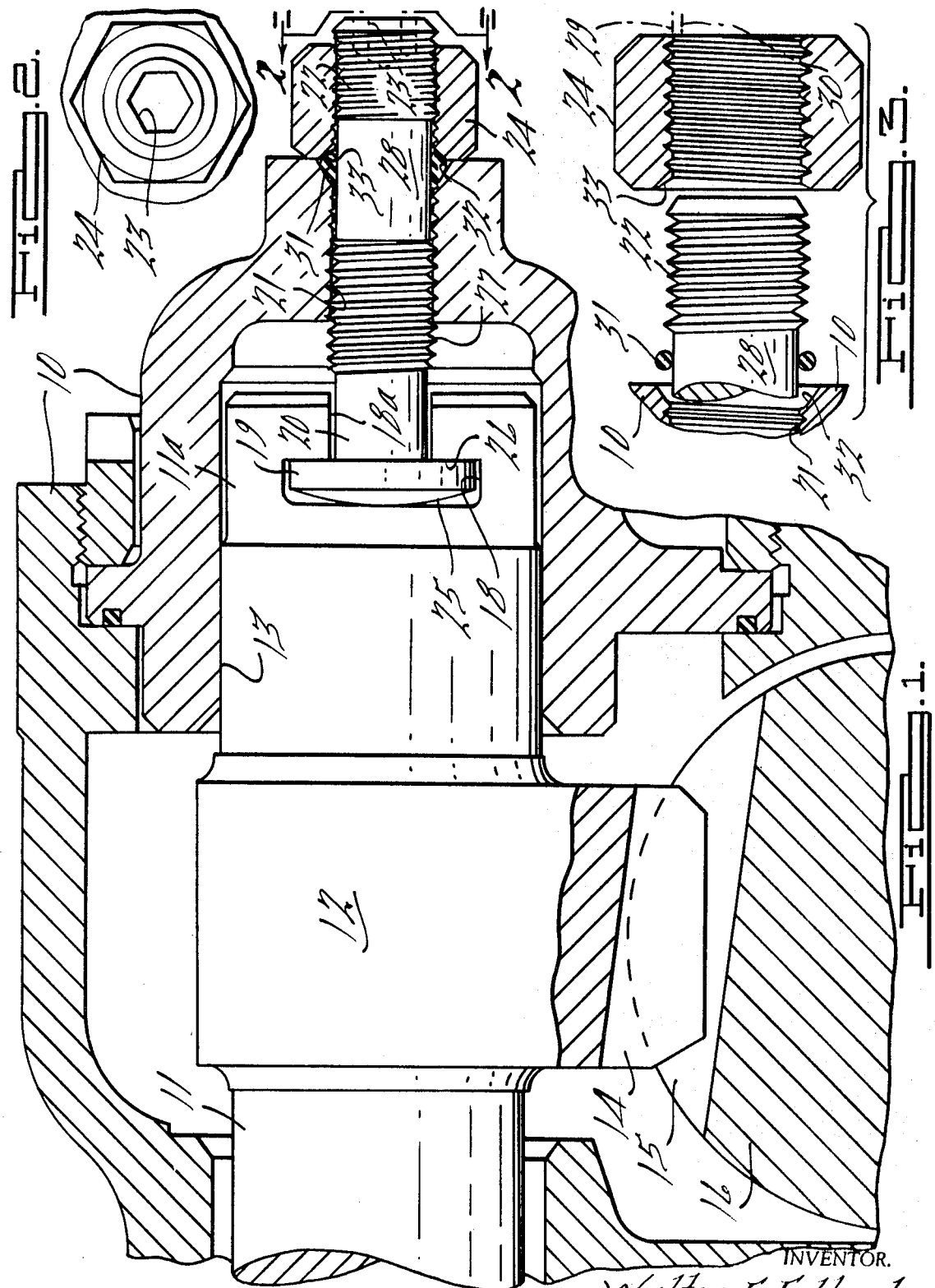
INVENTOR.
Walter E. Folkerts
BY
Harness Talbott & Baldwin
ATTORNEYS.

POWER STEERING GEAR

BACKGROUND AND SUMMARY OF THE INVENTION

This invention relates to improvements in an automobile steering mechanism of the type illustrated for example in Folkerts Pat. No. 3,252,348, to which reference is hereby made for a more complete description of details of construction and operation, wherein a sector gear on a cross shaft meshes with a fluid pressure actuated gear rack. In order to minimize lost motion during steering operations, the intermeshing teeth of the sector gear and rack are formed obliquely with respect to each other, so that by axially adjusting the cross shaft with respect to the rack, play between these intermeshing teeth can be eliminated. An adjusting bolt screws axially through the housing and engages the cross shaft to adjust the latter axially when the bolt is rotated. The housing is subject to the high pressure fluid that operates the gear rack, giving rise to a sealing problem resulting as the fluid tends to leak along the screw threads of the axially adjustable bolt.

It is an important object of the invention to provide simple, effective and economical improved adjusting means of the type described comprising a threaded bolt adjustable axially within a housing by screw action and adapted to be locked by a nut in adjusted position, and improved means for sealing the bolt and housing to prevent axial leakage of high pressure fluid. Although the invention is illustrated in application with adjustment means for the cross shaft of a fluid power operated automobile steering gear and is especially adapted for such use by reason of enabling a cost saving of approximately 4 cents per steering gear, as compared to conventional seals known to the art, the invention will have other applications where comparable axial adjustment and fluid sealing are desired.

Other objects of this invention will appear in the following description and appended claims, reference being had to the accompanying drawings forming a part of this specification wherein like reference characters designate corresponding parts in the several views.

FIG. 1 is a fragmentary sectional view through a steering gear embodying the present invention, taken longitudinally of the pivot axis of the sector gear.

FIG. 2 is an end view of FIG. 1.

FIG. 3 is a view showing the locking nut prior to assembly.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF A PREFERRED EMBODIMENT

Referring to the drawings, an embodiment of the present invention is illustrated by way of example in an automobile steering gear comprising a housing 10 containing a rock or cross shaft 11 pivotal about its longitudinal axis. Integral with the shaft 11 is a sector gear 12 adjacent a stub end 11a of the shaft 11 journaled within the housing 10 at 13.

The sector gear 12 is provided with a plurality of arcuately arranged teeth 14 intermeshing with a linear set of teeth 15 of a gear rack 16 mounted in housing 10 for reciprocating transversely of the axis of shaft 11. In accordance with customary practice the teeth 14 and 15 are bias formed with respect to each other so that upon axial shifting of shaft 11 and sector gear 12 to the left in FIG. 1, the teeth 14 and 15 will be brought into closer engagement with each other to take up slack or play therebetween.

Formed diametrically in stub shaft 11a is a T-slot 18 for the enlarged head 19 of a bolt 20 which extends coaxially through the reduced slot portion 18a of slot 18 opening endwise in stub shaft 11a. The bolt continues coaxially through a threaded bolt hole 21 in housing 10 and terminates outwardly in a threaded end 22 having a coaxial cavity 23 of hexagonal cross section for reception of a wrench to facilitate rotation and axial adjustment of the bolt 20. The latter is locked in its adjusted position by tightening of nut 24 against the adjacent portion of body 10, as shown.

The inner end surface of bolt head 19 is rounded at 25 to comprise a bearing surface abutting the pivotal stub shaft 11a at the base of the slot 18. The outer end face of head 19 freely confronts a parallel shoulder 26 normal to the axis of bolt 20 and defining an outer wall of slot 18, whereby pivoting of shaft 11 is unimpeded. It is apparent that upon loosening nut 24, bolt 20 can be rotated and thereby adjusted axially so as to adjust the play between the teeth 14 and 15, or to adjust for wear therebetween bearing surface 25 and stub shaft 11a, as for example by turning bolt 20 clockwise in FIG. 2 to move bolt 20 axially leftward in FIG. 1.

In a power operated steering mechanism of the type shown, the rack 16 is operated by pressurized fluid suitably directed against piston means, not shown. For the sake of compactness and economy, the housing 10 comprises a portion of the fluid circuit and is accordingly subject to the high pressure piston-operating fluid which tends to lead outwardly along the threads of bolt 20. In order to minimize such leakage the threaded bolt end 22 is spaced axially from the threaded portion 27, which latter engages the internally threaded bolt hole 21 in housing 10, by a smooth unthreaded sealing shank portion 28 having a diameter approximately equal to the pitch diameter of the threads 22 and 27.

In accordance with conventional practice, cylindrical bar stock having the diameter of unthreaded portion 28 may be forged or rolled to provide the threaded portions 22 and 27 spaced by the unthreaded shank portion 28, whereby the pitch diameter of the threads 22 and 27 will equal the diameter of shank portion 28, i.e., the original diameter of the bar stock. The head 19 and recess 23 may be formed by cold forging either before, after, or simultaneously with the formation of the threads 22 and 27 and without altering the diameter of the stock or bolt 20. The bolt 20 is finally hardened to strengthen its threaded portions and to withstand wear within the T-slot 18 resulting from pivotal steering movement of cross shaft 11.

The threads of the bolt hole 21 and the nut 24 may be formed initially by forging or other conventional processes, so as to mate in screw threaded relationship with the threaded bolt portions 22 and 27 respectively and may provide maximum and minimum internal diameters associated with the minimum and maximum diameters respectively of the threaded bolt portions 22 and 27. The bolt 20 is dimensioned so that the unthreaded portion 28 in the factory assembled position of the steering gear will extend partially into and partially out of the threaded bolt hole 21, FIG. 1. Accordingly prior to assembly the threads of nut 24 and bolt hole 21 are truncated to provide a minimum inner diameter for each approximately equal to the diameter of unthreaded portion 28, so that the latter will freely move axially into the nut 24 and housing bolt hole 21 as shown.

The truncation may be accomplished by removing the radially inner portions of the threads of bolt hole 21 and nut 24 between the phantom lines 29 and 30, FIG. 3, i.e., from slightly radially outwardly of the diameter of unthreaded portion 28, so that these latter threaded portions freely receive the unthreaded shank portion 28. By virtue of the hardened bolt, the thin radially outer portions of its threads 22 and 27 within the grooves of the truncated threads will support the axial thrust on bolt 20 resulting during operation of shaft 11 or from the tightening of nut 24.

Also by virtue of the unthreaded bolt portions 28, a comparatively smooth cylindrical sealing surface is provided to receive a conventional elastic O-ring 31 of rubberlike material. The latter fits snugly around the sealing surface 28 in sealing engagement therewith and with the adjacent portions of the housing 10 and nut 24. To this end the bolt hole 21 is provided with a smooth conical unthreaded endwise diverging enlargement 32 confronting a similar cooperating enlargement 33 of nut 24. The enlargements 32 and 33 confine the O-ring tightly therebetween and forcibly deform and press the latter into its aforesaid sealing engagement. The surface 32 in particular tends to cam the O-ring 31 into its sealing position when the nut 24 is tightened into abutment with housing 10 to lock bolt 20 against inadvertent displacement after assembly.

I claim:

1. In combination,
    A. a bolt having a pair of screw threaded portions spaced axially by an unthreaded shank sealing portion, the diameter of the unthreaded sealing portion being approximately equal to the pitch diameters of said threaded portions,
    B. a pair of relatively rotatable nut members,
        1. each having a threaded bolt hole mating with one of each of said threaded bolt portions,
        2. the threads of said members being truncated and the axial dimensions of said members being determined to enable movement thereof axially along said unthreaded sealing portion into abutment with each other at axially adjusted positions upon screwing thereof toward each other on their respective threaded bolt portions,
    C. and means to effect a high pressure fluid seal around said bolt comprising
        1. an elastic sealing ring closely fitting around said unthreaded sealing portion,
        2. an annular endwise opening enlargement of the bolt hole at an end of one of said members for tightly receiving at least a portion of said sealing ring pressed therein, and
        3. an annular face portion of the other of said members for pressing said ring into said enlargement in sealing engagement thereat with said one member and said unthreaded shank sealing portion when said members are screwed on their respective threaded portions into said abutment with each other.

2. In the combination according to claim 1, said one member at its bolt hole enlargement comprising an endwise enlarging cam for camming said ring radially inwardly toward said unthreaded shank portion upon tightening of said nut members into said abutment.

3. In the combination according to claim 1, said nut members comprising respectively a fluid containing housing for the pivotal sector gear of a power steering mechanism and a nut, a pivotal sector gear mounted in said housing for pivoting about an axis parallel to the axis of said bolt and for axial adjustable movement, fluid pressure operated means for pivoting said sector gear within said housing, said bolt extending into said housing from one of its threaded portions located exteriorly of said housing and having its other threaded portion in screw threaded engagement with said housing, means interengaging said bolt within said housing with said sector gear to adjust the latter axially by screw action of said bolt, said nut being screwed on said one threaded portion against said housing to lock said bolt in axially adjusted position.

4. In the combination according to claim 3, said one member at its bolt hole enlargement comprising an endwise enlarging cam for camming said ring radially inwardly toward said unthreaded shank portion upon tightening of said nut members into said abutment.

5. In the method of providing a fluid seal around the shank of a bolt releasably locked in axially adjusted position within a bolt hole through the sidewall of a housing for high pressure fluid, the steps of
    A. forming screw threads on said bolt at locations spaced axially by an unthreaded shank portion of said bolt having a diameter approximately equal to the pitch diameter of said threads,
    B. providing a nut having a bolt hole for said bolt,
    C. providing truncated screw threads within the bolt holes of said housing and nut for intermeshing with said threaded portions respectively of said bolt and having minimum internal diameters dimensioned for passage of the unthreaded shank portion of said bolt through said bolt holes,
    D. providing an axially adjustable elastic sealing ring around said unthreaded shank portion,
    E. providing confronting portions on said housing and nut cooperating to compress said ring therebetween and force the latter into sealing engagement with said unthreaded shank portion and at least one of said confronting portions when said housing, bolt, ring, and nut are assembled with said nut screwed tightly against said housing,
    F. screwing said bolt into said housing to a an axially adjusted position with only part of said unthreaded shank portion projecting axially from said housing, and
    G. locking said bolt in the adjusted position by screwing said nut on said bolt tightly against said housing to force said ring into said sealing engagement.

6. In the method according to claim 5, hardening the spaced screw threads on said bolt.

7. In the method according to claim 5, said steep of providing truncated screw threads within said bolt holes of said housing and nut mating with said threaded portions respectively of said bolt, and thereafter removing the radially inner portions of the threads within said bolt holes to provide said minimum internal diameters.

8. In the method according to claim 7, hardening the spaced screw threads on said bolt.